United States Patent [19]
Jones et al.

[11] Patent Number: 5,136,403
[45] Date of Patent: Aug. 4, 1992

[54] DISPLAY HAVING LIGHT SCATTERING ELECTRO-OPTICAL ELEMENT

[75] Inventors: Philip J. Jones, Mulborough, England; Akira Tomita, Redwood City, Calif.

[73] Assignee: Raychem Corporation, Menlo Park, Calif.

[21] Appl. No.: 653,564

[22] Filed: Feb. 11, 1991

[51] Int. Cl.$^5$ .............................................. G02F 1/13
[52] U.S. Cl. .................................... 359/52; 359/51
[58] Field of Search ............... 350/339 D, 347 V; 359/51, 52, 98

[56] References Cited

U.S. PATENT DOCUMENTS

| | | | |
|---|---|---|---|
| 3,905,682 | 9/1975 | Meyerhofer | 350/160 LC |
| 3,984,176 | 10/1976 | Hirai et al. | 350/345 |
| 4,435,047 | 3/1984 | Fergason | 350/334 |
| 4,591,233 | 5/1986 | Fergason | 350/334 |
| 4,606,611 | 8/1986 | Fergason | 350/350 R |
| 4,616,903 | 10/1986 | Fergason | 350/347 V |
| 4,648,691 | 3/1987 | Oguchi et al. | 350/338 |
| 4,671,618 | 6/1987 | Wu et al. | 350/350 R |
| 4,673,255 | 6/1987 | West et al. | 350/350 R |
| 4,685,771 | 8/1987 | West et al. | 350/347 V |
| 4,688,900 | 8/1987 | Doane et al. | 350/351 |
| 4,707,080 | 11/1987 | Fergason | 350/334 |
| 4,832,458 | 5/1989 | Fergason et al. | 350/334 |
| 4,890,902 | 1/1990 | Doane et al. | 350/347 V |
| 4,992,201 | 2/1991 | Pearlman | 252/299.1 |

FOREIGN PATENT DOCUMENTS

| | | |
|---|---|---|
| 0326248A2 | 8/1989 | European Pat. Off. . |
| 0409442 | 1/1991 | European Pat. Off. . |
| 0005996 | 1/1978 | Japan ........................... 350/339 D |
| WO90/03593 | 4/1990 | PCT Int'l Appl. . |

OTHER PUBLICATIONS

Haas, "Scattering Electro-Optic Cells," Xerox Disclosure Journal, vol 3, No. 5, Sep./Oct. 1978, pp. 333-334.
J. Applied Phy. 62(9); Angular discrimination of light transmission through polymer-dispersed liquid-crystal films; Wu et al.; pp. 3925-3931 (1987).
The Physics and Chemistry of Liquid Crystal Devices; IBM Research Library; pp. 190-194 (1979).

*Primary Examiner*—Stanley D. Miller
*Assistant Examiner*—Anita Pellman Gross
*Attorney, Agent, or Firm*—Yuan Chao; Herb Burkard

[57] ABSTRACT

A display having a first electrode means; a second electrode means; and a display medium positioned between the first and second electrode means, which display medium contains a pleochroic dye, is switchable between a first state in which incident light is substantially absorbed by the pleochroic dye and a second state in which the amount of such absorption is substantially reduced, and is capable of scattering incident light with a scattering half angle between about 5 and about 40 degrees when the display medium is in its second state, while permitting at least 10% of the incident light to be transmitted. The absolute difference between the ordinary index of refraction of the liquid crystal and the refractive index of the containment medium is 0.10 to 0.20.

7 Claims, 4 Drawing Sheets

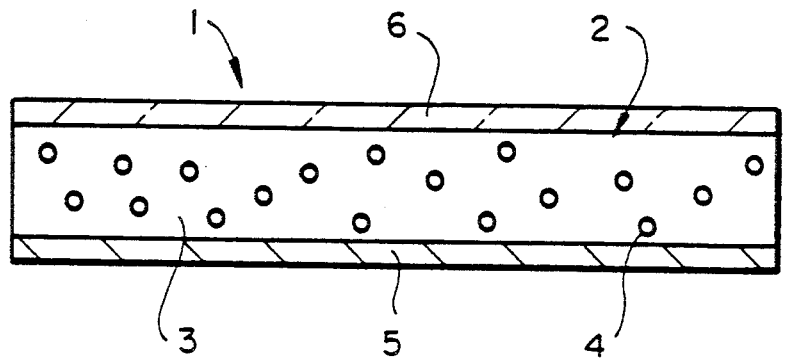
FIG_1
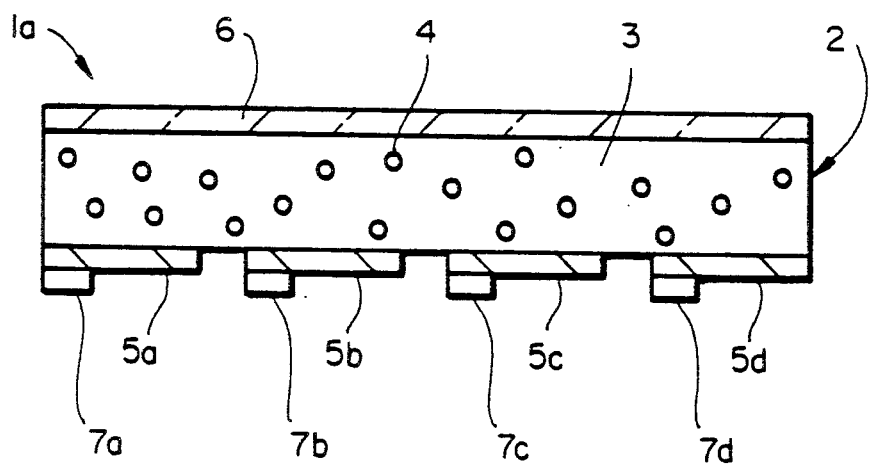
FIG_2

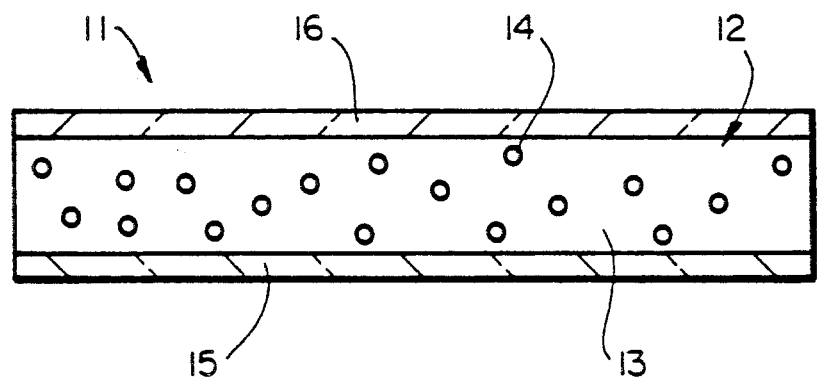
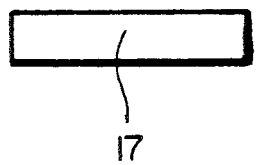
FIG_3

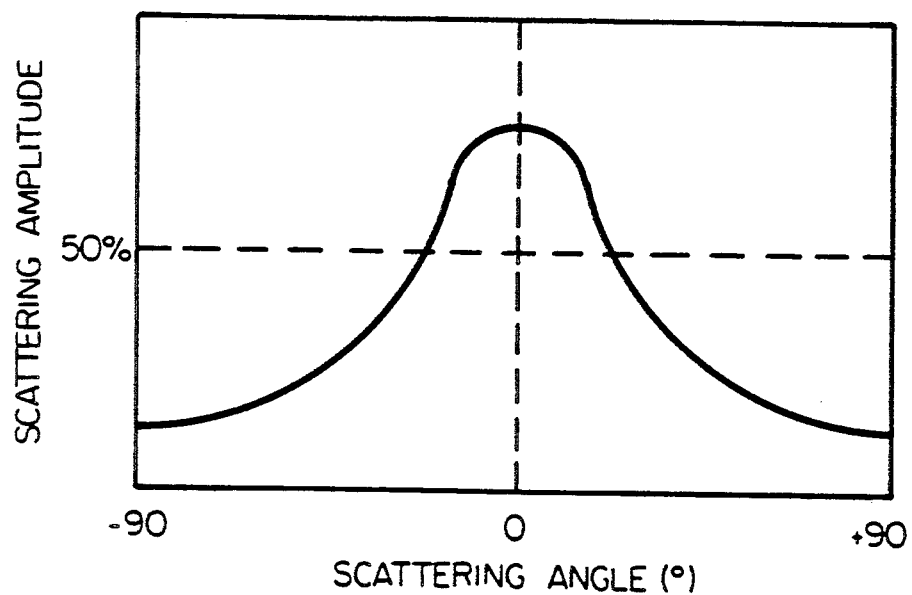
FIG_4a
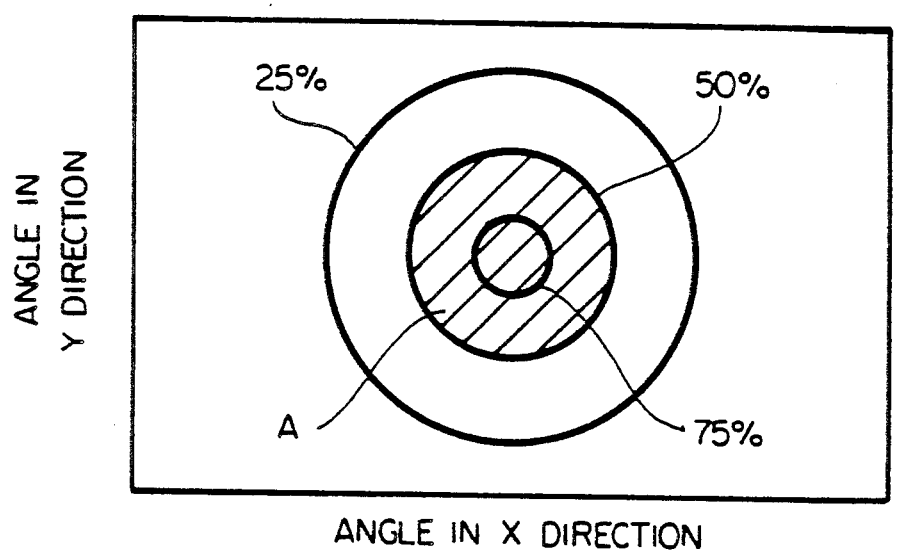
FIG_4b

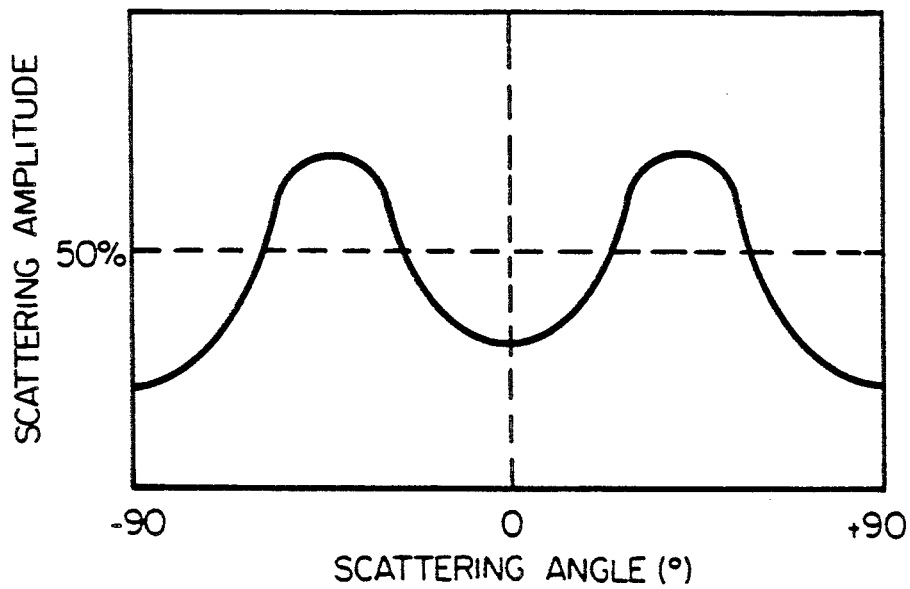
FIG_5a
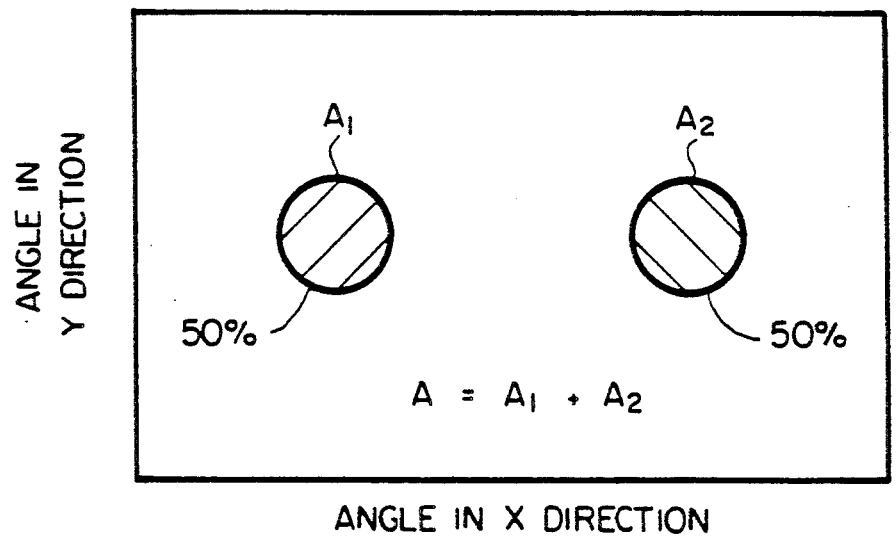
FIG_5b

DISPLAY HAVING LIGHT SCATTERING ELECTRO-OPTICAL ELEMENT

BACKGROUND OF THE INVENTION

This invention relates to displays having improved viewability.

Displays may be transmissive or reflective. In a transmissive display, the display lies between the viewer and the light source. In a reflective display, the viewer and the light source are on the same side of the display. Many displays are liquid crystal displays, in which the element which transitions between one optical state and a second optical state in response to an input (e.g., an electrical signal) comprises liquid crystal material.

A preferred type of liquid crystal display employs encapsulated liquid crystal material, in which liquid crystals are encapsulated or dispersed in a matrix (or containment medium) which can be, e.g., a polymer. When a voltage corresponding to a sufficiently strong electric field is applied across the encapsulated liquid crystal material (the "field-on" condition), the alignment of the liquid crystals is re-oriented in accordance with the field, so that incident light is transmitted. Conversely, in the absence of such a voltage (the "field-off" condition) the alignment of the liquid crystals is random and/or influenced by the liquid crystal-matrix interface, so that the liquid crystal material scatters incident light. The applied voltage at which the liquid crystal material begins to change from its field-off condition to its field-on condition is called the threshold voltage. If a reflector is positioned behind the display, then a reflective display is obtained, which appears bright in the field-on condition and darker in the field-off condition. If a light source is positioned behind the display, then a transmissive display can be obtained.

Encapsulated liquid crystal displays can include a pleochroic dye in the liquid crystal material to provide light control capabilities through absorption. In the field-on condition, the alignment of the pleochroic dye is determined by the alignment of the liquid crystals (which in turn is determined by the electric field). In this alignment, the absorption of incident light by the dye is at a minimum or substantially reduced, so that a substantial amount of incident light is transmitted. In the field-off condition, the alignment of the pleochroic dye also conforms to the alignment of the liquid crystals (but which are now random or distorted), so that significant light absorption occurs.

Thus, either a reflective or transmissive encapsulated liquid crystal display can be made to appear darker in the field-off condition by the scattering or the absorption of the incident light, or both, and brighter in the field-on condition because scattering and/or absorption is reduced, permitting the incident light to reach the reflector or be transmitted through the display, as applicable.

In reflective displays the reflector can have an important effect on the perceived brightness. At one end of the scale the reflector can be Lambertian, with excellent viewing angle, but low brightness. At the other end of the spectrum would be a specular mirror with viewing angle limited by the surrounding lighting fixtures, but with the brightness of those fixtures.

In a reflective display of the type used in laptop computers, and in particular colored ones, some aperturing of the picture is unavoidable due to the pixel structure. With a Lambertian reflector this leads to excessive light loss. For a specular reflective display obtaining light uniformity and good viewing angles is difficult (e.g., the viewer sees his own reflection in the display). Empirically, some degree of diffusion is needed to produce a pleasing display.

We have invented a display with improved viewability by providing for some residual scattering in the field-on condition.

SUMMARY OF THE INVENTION

A display of this invention comprises a first electrode means; a second electrode means; and a display medium positioned between the first and second electrode means, which display medium contains a pleochroic dye, is switchable between a first state in which incident light is substantially absorbed by the pleochroic dye and a second state in which the amount of such absorption is substantially reduced, and is capable of scattering incident light with a scattering half angle between about 2 and about 40 degrees when the display medium is in its second state, while permitting at least 10% of the incident light to be transmitted.

This invention also provides a liquid crystal display medium switchable between a first state in which incident light is substantially absorbed by a pleochroic dye and a second state in which the amount of such absorption is substantially reduced upon the application of a sufficient electric field, comprising: a containment medium; discrete volumes of liquid crystals dispersed in the containment medium; and pleochroic dye contained in the liquid crystals; wherein the absolute difference between the ordinary refractive index of the liquid crystals and the refractie index of the containment medium is between about 0.05 and about 1.00.

BRIEF DESCRIPTION OF THE DRAWING(S)

FIGS. 1 and 2 depict reflective displays according to this invention.

FIG. 3 depicts a transmissive display according to this invention.

FIGS. 4a–b and 5a–b illustrate schematically some possible scattering patterns of displays of this invention.

DESCRIPTION OF THE PREFERRED EMBODIMENTS

A preferred display medium is encapsulated liquid crystal material, whose preparation is disclosed in U.S. Pat. Nos. 4,435,047 (1984), 4,606,611 (1986), 4,616,903 (1986), and 4,707,080 (1987), all to Fergason; published European patent application EP 156,615 (1985), by Pearlman et al.; U.S. Pat. No. 4,671,618 (1987), to Wu et al.; U.S. Pat. Nos. 4,673,255 (1987) and 4,685,771 (1987), to West et al.; and U.S. Pat. No. 4,688,900 (1987) to Doane et al.; the disclosures of each which are incorporated herein by reference. In encapsulated liquid crystal material, discrete volumes of liquid crystals are encapsulated, dispersed, embedded or otherwise contained in a containment medium or matrix. "Liquid crystals" denotes a composition having liquid crystalline properties, whether that composition is a single discrete liquid crystalline compound, a mixture of different liquid crystalline compounds, or a mixture of liquid crystalline and non-liquid crystalline compounds. Preferably, the liquid crystals are nematic or operationally nematic. More preferably, they also have a positive dielectric anisotropy.

Liquid crystals have typically elongated molecular shapes, with a tendency to align or orient themselves with their long molecular axes parallel to each other. This alignment causes liquid crystals to be anisotropic, meaning that their measured physical, optical, and other properties are dependent on the direction of measurement (parallel or perpendicular to the direction of alignment). Further, the alignment direction can be influenced by an external stimulus, such as an electrical or magnetic field, causing the liquid crystals to exhibit a particular value of a physical characteristic in one direction when the stimulus is absent, but rapidly switching to a different value when the stimulus is applied. It is because of their anisotropy and their ready realignment that liquid crystals are useful as materials for displays.

The containment medium is preferably a polymeric material. Suitable containment media include but are not limited to poly(vinyl alcohol) and poly(vinyl alcohol) copolymers, gelatin, polyurethane, poly(ethylene oxide), poly(vinyl pyrrolidone), cellulosic polymers, natural gums, acrylic and methacrylic polymers and copolymers, epoxies, polyolefins, vinyl polymers, and the like. Poly(vinyl alcohol) is a preferred containment medium.

Encapsulated liquid crystal material can be formed by deposition from an emulsion containing both the containment medium and liquid crystals or by the evaporation of liquid from a solution containing both containment medium and liquid crystals. It can also be formed by making an initially homogeneous mixture containing both containment medium and liquid crystals at an elevated temperature, then cooling to phase-separate out liquid crystal volumes contained in the containment medium. Further, it can be formed by an in-situ polymerization process, in which the containment medium is polymerized and simultaneously encapsulates liquid crystal material. The liquid crystal need not be entirely surrounded by the polymer, and may exist as part of a system with co-continuous phases.

The display medium contains pleochroic dyes mixed with liquid crystals to form a solution therewith. The molecules of pleochroic dyes generally align with the molecules of liquid crystals, so that the application of the electric field affects not only the predominant alignment of the liquid crystals, but also of the pleochroic dye. As the extent of the absorption of incident light by the pleochroic dye depends on its orientation relative to the incident light, the application of an external stimulus to a liquid crystal-pleochroic dye combination also provides a means for the controlled attenuation of light. Generally, the pleochroic dye is in a substantially more light absorbing state in the field-off condition and in a substantially more light transmissive state in the field-on condition. (Thus, as used herein, the term "liquid crystals" also means, in context, liquid crystals containing pleochroic dye dissolved therein.) Pleochroic dyes may be used in encapsulated liquid crystals to form colored displays. Thus, a display capable of displaying colored images can be formed by depositing side by side red, blue, and green pixels.

In the field-off condition, the alignment of the liquid crystals is random or determined by the interfacial forces at the liquid crystal/polymer matrix interface. When the electric field is applied, it induces a change in the alignment of the liquid crystals. If the liquid crystals have a positive dielectric anisotropy and the ordinary index of refraction of the liquid crystals is matched with the refractive index of the containment medium, then in this realigned state the liquid crystal/polymer matrix combination is substantially transparent. Conversely, if these two refractive indices are mismatched, there is some residual amount of scattering. In this invention the refractive indices are selected to be mismatched to the extent of producing a display with improved viewability. The degree of mismatch—i.e. the absolute value of the difference—between the ordinary refractive index of the liquid crystals and the refractive index of the containment medium is preferably between about 0.05 and about 1.00. More preferably the degree of mismatch is between about 0.10 and 0.20.

Referring now to the figures, FIG. 1 depicts a display 1 including a display medium 2 comprising droplets of liquid crystals 4 (for example operationally nematic liquid crystals) containing a pleochroic dye, encapsulated in a polymer matrix 3. Behind and in front of display medium 2 are electrode means 5 and 6, respectively, for applying a voltage, which when greater than the threshold voltage, causes display material 2 to switch from one optical state to the other. Electrode means 5 can be reflective, for example made of a thin film of aluminum or other reflective material such as silver or a multilayer dielectric stack, for reflecting light passing through display medium 2 back therethrough, to make a reflective display. Electrode means 6 can be made of a transparent conductive material, such as indium tin oxide (ITO).

In FIG. 2 a similar display 1a is shown (like numerals referring to like elements in FIGS. 1 and 2). Display 1a differs from display 1 in that the rear electrode means, instead of being monolithic, comprises a plurality of smaller electrodes 5a–d. Such a construction is preferred where the display is intended to display a variable image, ranging from text to graphics, formed from the combination of a large number of pixels, each in the appropriate "on" or "off" state. Each of electrode means 5a–d can apply an electric field to the display material above it, thereby defining a pixel. Each of electrode means 5a–d can be individually controlled by a corresponding switching means 7a–d such as a varistor, as described in copending commonly assigned applications Ser. Nos. 07/520,590, filed May 8, 1990, of Thompson et al. and Ser. No. 07/520,685, filed May 8, 1990, of Becker et al. Other suitable switching means 7a–d include thin film transistors (TFT's), diodes, and metal-insulator-metal constructions (MIM's). As in the instance of electrode means 5 in FIG. 1, electrode means 5a–d can be reflective, to make display 1a a reflective display.

FIG. 3 shows a transmissive display 11 of this invention, comprising a display material 12 sandwiched between electrodes 15 and 16, which can be made of ITO. Display material 12 comprises a containment medium 13 having dispersed therein droplets of liquid crystal 14. Backlighting is provided by light source 17, at the rear. The mismatch in the refractive indices creates residual scattering which can be used to hide details of light source and to render the brightness of the display more uniform. If a separate diffuser plate were used, light can be lost since highly scattered light is more easily reflected out of the path of the cell. Collimated light, for example from a parabolic mirror, can be used.

The degree of scattering imparted by the scattering centers should correspond to a scattering half angle between about 2 and about 40 degrees, preferably between about 10 and about 20 degrees, more preferably between 15 and 20 degrees. The scattering half angle ($\theta_s$) means the square root of $A/\pi$:

$$\theta_s = (A/\pi)^{\frac{1}{2}}$$

where A (in units of (degree)$^2$) is the area enclosed by the 50% contour(s), such area A corresponding to the area(s) within which the scattering is greater than 50% of the maximum.

In many instances the scattering is symmetric, in which case the 50% contour will be centrosymmetric, but this is not necessarily so, and asymmetric scattering and/or multiple scattering maxima, and consequently asymmetric 50% contours can occur. FIG. 4a shows the scattering diagram for a symmetric, unimodal, scattering situation. In such an instance, the 50% contour defines an approximately circular area A, as shown in FIG. 4b. However, where the scattering is bimodal and/or asymmetric, as shown in FIG. 5a, then there are multiple areas $A_1$ and $A_2$ defined by the 50% contours, as shown in FIG. 5b, and A is their sum.

The scattering provides for a more pleasing display. In a reflective display, if the degree of scattering is too low, i.e., as in prior art displays having a highly specular reflector and no scattering as taught in this invention, then the mirror-like reflections are not sufficiently suppressed. This effect is to some extent dependent on the size of the display. A small display, for example about 4 inches diagonal, can tolerate a lower degree of scattering than a larger display, for example about 14 inches diagonal, because the amount of structure seen in the reflector is likely to be much less.

This invention provides several advantages. The brightness is improved over a wider range of viewing angles than with a specular mirror which is only bright when the eye sees the images of the light sources in the room. Glare from the light sources is reduced, making display appearance (contrast, brightness, etc.) less dependent on the exact viewing angles and placement of the light sources in the room. However, this does not mean that the higher the degree of scattering, the better the viewability of the display—rather, the degree of scattering should be within the ranges taught herein. If the degree of scattering is too high, then high angle scattered light is trapped in the display, to be absorbed by any pleochroic dye present, and the optical gain is too low for most viewing purposes.

What is claimed is:

1. A display comprising:
    a first electrode means;
    a second electrode means; and
    a display medium positioned between the first and second electrode means, which display medium is switchable between a first state in which incident light is substantially absorbed by a pleochroic dye and a second state in which the amount of such absorption is substantially reduced, the display medium comprising a containment medium, discrete volumes of liquid crystals dispersed in the containment medium, and pleochroic dye contained in the liquid crystals, the absolute difference between the ordinary refractive index of the liquid crystals and the refractive index of the containment medium being between about 0.10 and about 0.20.

2. A display according to claim 1, wherein the liquid crystals are positive dielectric anisotropy, operationally nematic liquid crystals.

3. A display according to claim 1 or 2, wherein the second electrode means is reflective, for reflecting light passing through the display medium back through the display medium.

4. A display according to claim 1 or 2, wherein the second electrode means is transparent.

5. A display according to claim 4, further comprising a light source behind the second electrode means.

6. A liquid crystal display medium switchable between a first state in which incident light is substantially absorbed by a pleochroic dye and a second state in which the amount of such absorption is substantially reduced, comprising:
    a containment medium;
    discrete volumes of liquid crystals dispersed in the containment medium; and
    pleochroic dye contained in the liquid crystals; wherein the absolute difference between the ordinary refractive index of the liquid crystals and the refractive index of the containment medium is between about 0.10 and about 0.20.

7. A liquid crystal display medium according to claim 6, wherein the liquid crystals are positive dielectric anisotropy, operationally nematic liquid crystals.

* * * * *